United States Patent [19]

Cloup

[11] 4,285,197
[45] Aug. 25, 1981

[54] ISOTHERMAL CHAMBER AND HEAT ENGINES CONSTRUCTED USING SAID CHAMBER

[76] Inventor: Jean Cloup, Chateau Beaugey, Carignan, 33360 Latresne, France

[21] Appl. No.: 11,361

[22] Filed: Feb. 12, 1979

[30] Foreign Application Priority Data

Feb. 15, 1978 [FR] France ............................. 78 04308

[51] Int. Cl.³ .............................................. F02G 1/04
[52] U.S. Cl. ...................................... 60/525; 60/517; 92/45; 417/367
[58] Field of Search ................. 60/508, 509, 512, 517, 60/518, 525; 126/247; 92/42, 45; 417/367, 472

[56] References Cited

U.S. PATENT DOCUMENTS

| | | | |
|---|---|---|---|
| 1,181,802 | 5/1916 | Rogge | 92/45 X |
| 3,157,024 | 11/1964 | McCrory et al. | 60/525 |
| 3,315,465 | 4/1967 | Wallis | 60/518 |

FOREIGN PATENT DOCUMENTS

| | | | |
|---|---|---|---|
| 293025 | 10/1914 | Fed. Rep. of Germany | 417/472 |
| 1007422 | 5/1952 | France | 60/525 |

*Primary Examiner*—Allen M. Ostrager
*Assistant Examiner*—Stephen F. Husar
*Attorney, Agent, or Firm*—DeLio and Montgomery

[57] ABSTRACT

Isothermal chamber comprising deformable walls and acting as a heat exchanger.

It is constituted by two walls 3,3a of complementary shape defining between them an enclosure 4 containing a gas, the said walls having a deformable zone 5 and a rigid zone 6 providing a variable capacity in heat exchange with an auxiliary fluid, in such a way that the gas contained in the enclosure will undergo substantially isothermal transformations.

The invention is employed for the construction of gas compressors and heat engines.

8 Claims, 5 Drawing Figures

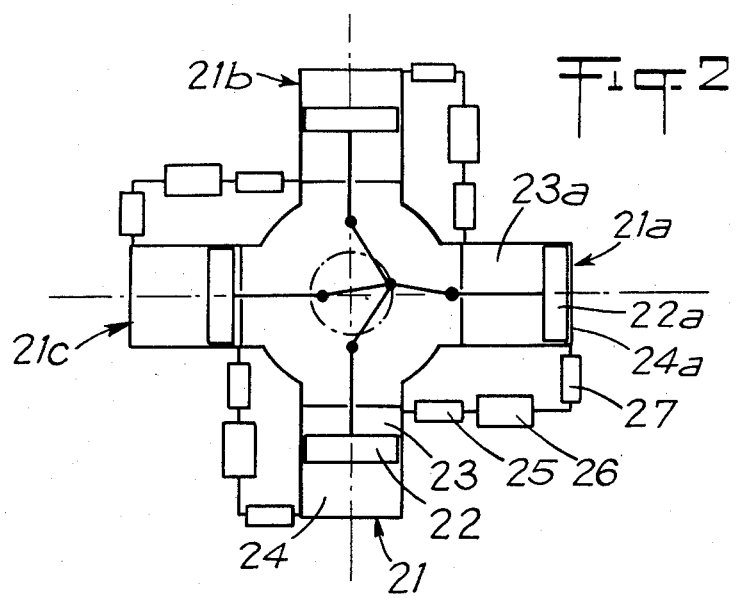
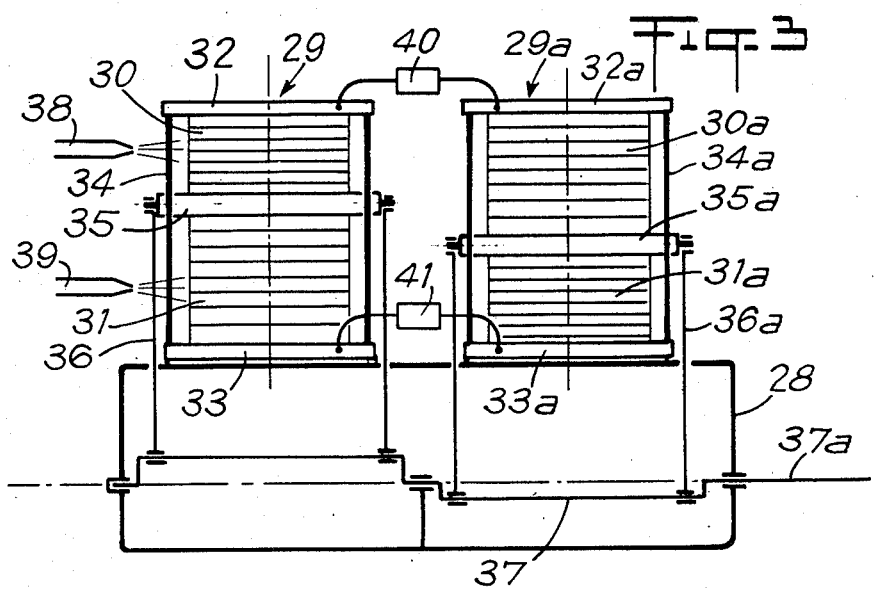

ISOTHERMAL CHAMBER AND HEAT ENGINES CONSTRUCTED USING SAID CHAMBER

The present invention has as its subject an isothermal chamber and heat engines constructed using said chamber.

Numerous heat engines comprise chambers intended to compress or to expand bodies of gas. Most usually, these chambers are constituted by a rigid enclosure one face of which is movable, generally a cylinder and a piston.

In these machines, the charge of gas is compressed or expanded along an isochor very close to the adiabatic, and the amounts of heat produced lead to the production of a mechanical work output, which is greater when it is a matter of compression and a work input, smaller when it is a matter of an expansion. In the two cases an isothermal transformation would permit one to obtain a better efficiency.

The present invention has as its subject a chamber comprising deformable walls and acting as a heat exchanger, arranged in such a way that the gas contained by the said chamber will undergo transformations very close to the isothermal.

According to the present invention, the chamber is constituted by two walls of complementary shapes defining between them an enclosure containing a gas, the said walls providing a deformable zone and a rigid zone leading to a variable capacity in heat exchange with an auxiliary fluid, in such a way that the gas contained in the enclosure will undergo substantially isothermal transformations.

The principle advantage of the chamber according to the invention lies in the fact that the functions of variation of volume and of heat exchange with the exterior are brought about simultaneously in the same component.

Other features and advantages of the invention will be better understood from reading of the description which will follow of various embodiments and with reference to the accompanying drawings in which:

FIG. 2 is a schematic view of a hot gas engine of known type operating according to the Stirling cycle;

FIG. 3 is a schematic view of a heat engine operating according to the Stirling cycle and comprising isothermal chambers according to the invention;

Figure 1:
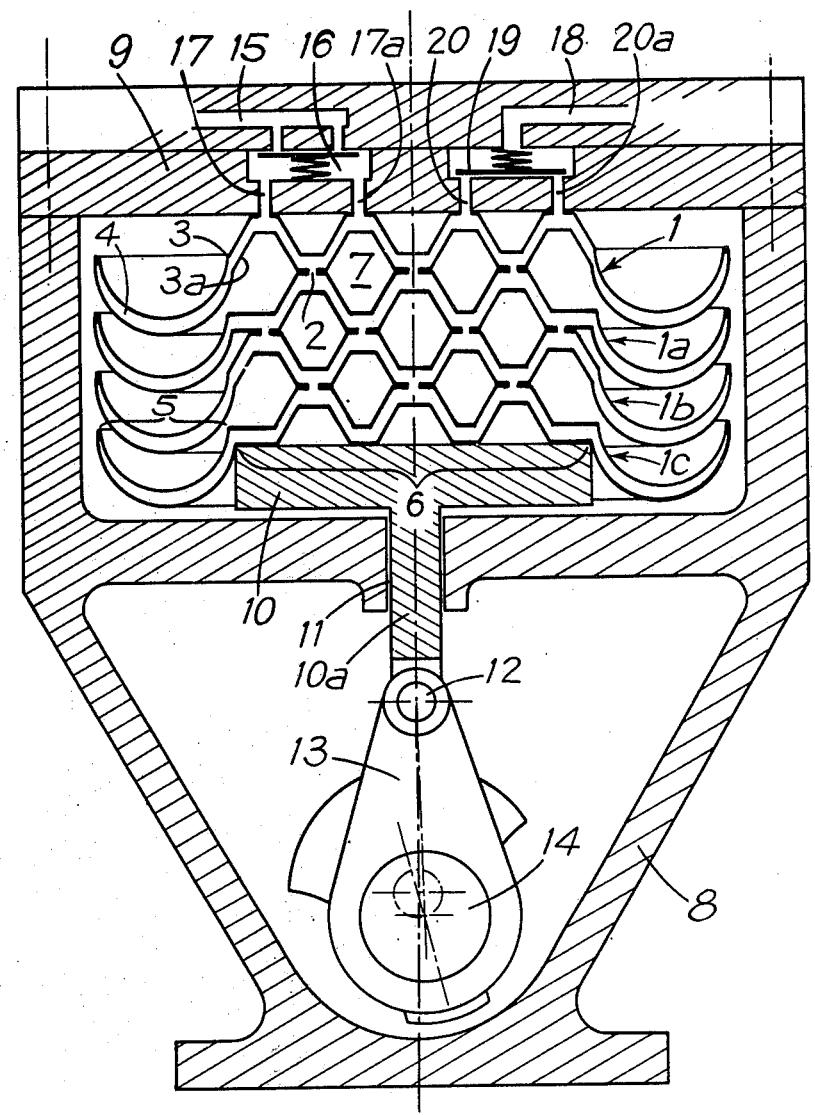
FIG. 1 is a view in elevation and in axial section of an embodiment of a gas compressor comprising isothermal chambers according to the invention.
Figure 4:
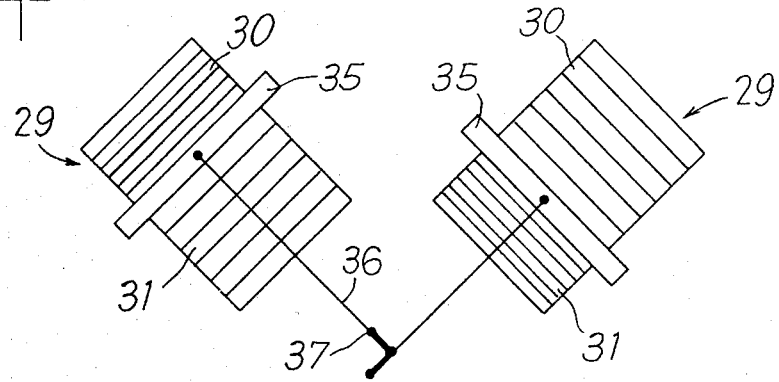
FIG. 4 is a schematic view illustrating stacks of chambers arranged in a double V around the axis of the crankshaft.
Figure 5:
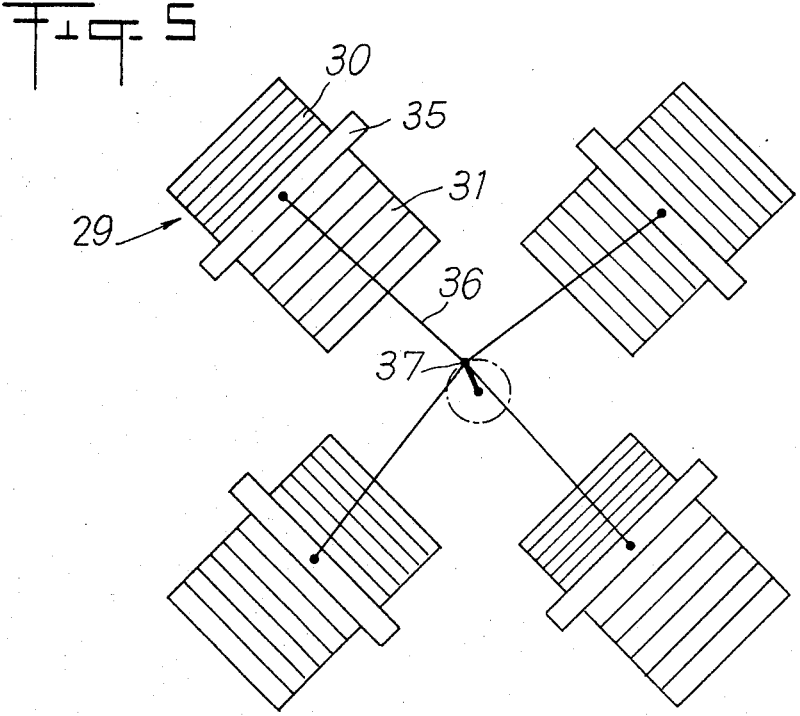
FIG. 5 is a schematic view illustrating assemblies of stacks of chambers arranged in a double star around the axis of the crankshaft.

In FIG. 1 there is shown a gas compressor which comprises a plurality of superimposed isothermal chambers 1, 1a, 1b, 1c, which communicate with one another through openings 2. Each chamber is constituted by two walls of complementary shapes 3, 3a defining between them an enclosure 4 containing a gas, the said walls 3, 3a having a deformable zone 5 constituting a variable capacity and having the shape of a half torus extending circumferentially around a central rigid zone 6 having grooves defining, between two adjacent chambers, passages 7 for circulation of an auxiliary fluid for heat exchange with the gas contained in the enclosures 4 of the chambers. In the embodiment shown, the grooves of the rigid zone 6 have a trapezoidal section and constitute passages 7 of hexagonal section, but it is clear that the grooves and the passages could have any other shape.

The individual chambers 1, 1a, 1b, 1c are obtained particularly by simultaneous stamping of two thin sheets of metal which are welded at their periphery in the deformable zone 5.

The gas compressor is constituted by a support 8 provided at its upper part with a fixed plate 9 against which the chamber 1 of the stack abuts by its rigid zone 6, while the chamber 1c abuts with its rigid zone 6 against a plate 10 driven with a reciprocating movement and situated opposite the fixed plate 9. The stack of chambers 1 to 1c contained between the plates 9 and 10 is very rigid and does not undergo any variation of volume if variations of pressure are applied within the chamber while the plates are held.

In a known manner the movable plate 10 is fixed to a rod 10a which is arranged to slide in a bore 11 in the support 8, and which is pivoted on an axis 12 to a connecting rod 13 mounted to rotate on a crank pin 14 of a driving shaft.

The assembly of chambers 1 to 1c, of which the enclosures 4 communicate with one another through the openings 2, are connected on one hand to an inlet passage 15 via a one-way valve 16 and passages 17, 17a opening into the chamber 1, and on the other hand to a discharge passage 18 via a one-way valve 19 and passages 20, 20a opening into the chamber 1.

The isothermal chambers 1 to 1c according to the invention are capable of being applied to machines other than a compressor, and in particular to known heat engines using the Stirling cycle, such as that shown in FIG. 2.

These heat engines using hot gas or hot air comprise a plurality of cylinders 21, 21a, 21b, 21c which in the embodiment shown are arranged in a star, in which are slidingly mounted double-acting pistons such as 22, 22a which define cold spaces 23, 23a and hot spaces 24, 24a.

The cold space 23 of a cylinder 21 is connected to the hot space 24a of the following cylinder via a cooler 25, a regenerator 26 and a heater 27, in particular a burner.

The heat regenerator 26 is preferably constituted by stacks of metal cloth.

In this engine the cold air coming from the cold space 23 passes through the cooler 25, the regenerator 26 where it is heated by the porous metal mass which has been heated during the previous cycle, and it passes through the heater 27 before entering into the hot space 24a where it is expanded in the cylinder 21a, then it is discharged at constant volume into the cold space of the cylinder 21 while passing through the regenerator 26 which the hot air heats in transit before passing through the cooler 25. Finally, the cooled air is compressed in the cold space 23 before being again directed into the hot space 24a as described previously.

Now such an engine has numerous practical inconveniences as regards poor suitability for operation within a casing and risks of leaks, and especially the transformations are close to adiabatics, and not to isothermals.

The isothermal chamber according to the invention can be used for the production of a heat engine of this Stirling-cycle kind.

In FIG. 3 is shown a Stirling-cycle heat engine which is constituted by a frame or casing 28 on which are mounted two assemblies 29, 29a of stacks of chambers, which are respectively constituted of two stacks of chambers 30, 30a and 31, 31a which are shown in schematic manner but which are identical with those shown in FIG. 1. Each assembly 29, 29a of the two stacks of chambers is arranged between two fixed plates 32, 32a and 33, 33a which are connected by tie rods 34, 34a fixed to the frame or casing 28.

A movable plate 35, 35a with reciprocating motion is connected by a connecting rod 36, 36a to a crank shaft 37 of which the cranks are offset by about 90°, the said plate 35, 35a being arranged between the stacks of chambers 30, 31 and 30a, 31a.

The stacks of chambers 30, 31 are subjected to the action of a heating means 38, 39 and constitute the hot spaces of the Stirling-cycle engine, while the stacks of chambers 30a, 31a constitute the cold chambers which are in contact with a cooling fluid. Each of the stacks of chambers 30, 31 is connected to each of the stacks of chambers 30a, 31a by heat regenerators 40, 41.

Although a crank shaft with fixed cranks has been shown and described, it is equally possible to use a means of variable adjustment of the cranks which would permit control of the output or the power of the engine.

In FIG. 3 two assemblies of two stacks of chambers arranged in line are shown, but it is obvious that these assemblies can be arranged in a double V and in a double star around the axis of the crankshaft.

This heat engine can function as a hot gas motor and the output shaft 37a from the crankshaft can be used for driving any machine.

However, this heat engine can equally operate as a heat pump if it is driven by the shaft 37a.

Of course various modifications can be made by the man in the art to the mechanisms or methods which have just been described solely by way of non-limiting examples, without going outside the scope of the invention.

I claim:

1. An isothermal chamber constituted by two walls of complementary shapes connected at their peripheries to define between them an enclosure containing a gas, the said walls having a deformable circumferential zone and a central rigid zone providing a variable capacity, means for passing an auxiliary fluid in heat exchange relation with said rigid zone, whereby the gas contained in the enclosure will undergo substantially isothermal transformations, the walls of the chamber being shaped to provide in the deformable circumferential zone the shape of a half torus, and in the central rigid zone grooves constituting the means for the passage of the auxiliary fluid.

2. A heat engine comprising superimposed isothermal chambers, according to claim 1, the enclosures of which are connected together, and the rigid zones of the walls of which are arranged to constitute, between the said chambers, passages for circulation of an auxiliary fluid for heat exchange with the gas contained in the said enclosures.

3. A heat engine comprising isothermal chambers, each according to claim 1, superimposed by means of their rigid zones between two plates, means fixing one of said plates, and means for actuating the other of said plates with a reciprocating movement, the said chambers having their peripheral zone freely deformable.

4. A heat engine for the compression of a gas, according to claim 3, comprising one-way valves connecting said enclosures of the chambers to passages for admission and exhaust of gas.

5. An apparatus operating according to the Stirling cycle as a heat pump or as a hot gas motor, according to claim 3, comprising at least a first stack of said chambers, a source of heat acting on said first stack, at least a second stack of chambers, means subjecting said second stack to the action of a cooling fluid, each first hot stack being connected to the second cold stack via a heat regenerator, and means for reciprocating displacement connected both to the said stacks of chambers and to a driving or driven crankshaft.

6. A heat engine operating according to the Stirling cycle, according to claim 5, comprising at least two assemblies of two stacks of said chambers, two fixed plates at the ends of each assembly of two stacks of chambers, and a movable plate with reciprocating motion arranged between the two stacks of chambers in each assembly and connected by at least one connecting rod to a crankshaft.

7. A heat engine according to claim 6, wherein a plurality of assemblies of two stacks of chambers are arranged in a double V around the axis of the crankshaft.

8. A heat engine according to claim 6, wherein a plurality of assemblies of two stacks of chambers are arranged in a double star around the axis of the crankshaft.

* * * * *